US010819273B2

(12) United States Patent
Cromie et al.

(10) Patent No.: US 10,819,273 B2
(45) Date of Patent: Oct. 27, 2020

(54) TILTING SOLAR PANELS FOR HIGH ALTITUDE BALLOONS

(71) Applicant: LOON LLC, Mountain View, CA (US)

(72) Inventors: John Cromie, Menlo Park, CA (US); Kyle Brookes, Redwood City, CA (US)

(73) Assignee: Loon LLC, Mountain View, CA (US)

( * ) Notice: Subject to any disclaimer, the term of this patent is extended or adjusted under 35 U.S.C. 154(b) by 20 days.

(21) Appl. No.: 15/843,197

(22) Filed: Dec. 15, 2017

(65) Prior Publication Data

US 2019/0190439 A1    Jun. 20, 2019

(51) Int. Cl.
| | |
|---|---|
| H02S 20/30 | (2014.01) |
| H02S 20/32 | (2014.01) |
| B64B 1/40 | (2006.01) |
| H02S 10/40 | (2014.01) |
| H02S 30/20 | (2014.01) |

(52) U.S. Cl.
CPC ............. *H02S 20/32* (2014.12); *B64B 1/40* (2013.01); *H02S 10/40* (2014.12); *H02S 30/20* (2014.12)

(58) Field of Classification Search
None
See application file for complete search history.

(56) References Cited

U.S. PATENT DOCUMENTS

| | | | | | |
|---|---|---|---|---|---|
| 2,285,033 | A | * | 6/1942 | Judels | ............ E06B 9/305 |
| | | | | | 160/168.1 R |
| 4,361,295 | A | * | 11/1982 | Wenzel | ............ B64B 1/40 |
| | | | | | 244/33 |
| 2012/0111509 | A1 | * | 5/2012 | Mullet | ............ E06B 9/308 |
| | | | | | 160/331 |
| 2013/0240025 | A1 | * | 9/2013 | Bersano | ............ H01L 31/042 |
| | | | | | 136/251 |
| 2013/0264413 | A1 | * | 10/2013 | Aoki | ............ B64B 1/30 |
| | | | | | 244/33 |
| 2014/0048646 | A1 | * | 2/2014 | DeVaul | ............ C25B 1/04 |
| | | | | | 244/97 |

(Continued)

OTHER PUBLICATIONS

Mark Garcia, Brian Dunbar, About the Space Station Solar Arrays, URL: https://www.nasa.gov/mission_pages/station/structure/elements/solar_arrays-about.html), Aug. 3, 2017, pp. 1-4.

(Continued)

*Primary Examiner* — Devina Pillay
(74) *Attorney, Agent, or Firm* — Botos Churchill IP Law

(57) ABSTRACT

A stratospheric balloon may include an upper structure having a pulley, a lower structure, at least one solar panel suspended between the upper structure and the lower structure, and a first orientation control member connected, at a first end thereof, to a first transverse edge of the at least one solar panel and, at a second end thereof, to a second transverse edge of the at least one solar panel. The first orientation control member is wound about the pulley such that rotating the pulley changes the orientation of the at least one solar panel relative to the upper structure and the lower structure. In another example, the pulley may be replaced by first and second support mechanisms and the system may include a second orientation control member. The first and second orientation control members are connected to the first and second support mechanisms, respectively, and to the solar panel.

13 Claims, 10 Drawing Sheets

(56) References Cited

U.S. PATENT DOCUMENTS

2016/0190981 A1* 6/2016 Hong .................... H02S 20/22
                                                          136/246
2017/0356241 A1* 12/2017 Lin ......................... E06B 9/32

OTHER PUBLICATIONS

Mark Garcia, Brian Dunbar,"International Space Station Solar Arrays", URL:https://www.nasa.gov/mission_pages/station/structure/elements/solar_arrays.html, Aug. 3, 2017, pp. 1-8.
Mika McKinnon, "Solar Panels Are the Overlooked Workhorses", URL: https://gizmodo.com/solar-panels-are-the-overlooked-workhorses-of-the-inter-1737149074, Oct. 30, 2015, pp. 1-5.
Samantha Mathewson, "NASA Tests Flexible Roll-Out Solar Array on Space Station", URL: https://www.space.com/37250-roll-out-solar-arrays-on-space-station.html, Jun. 20, 2017, pp. 1-8.

* cited by examiner

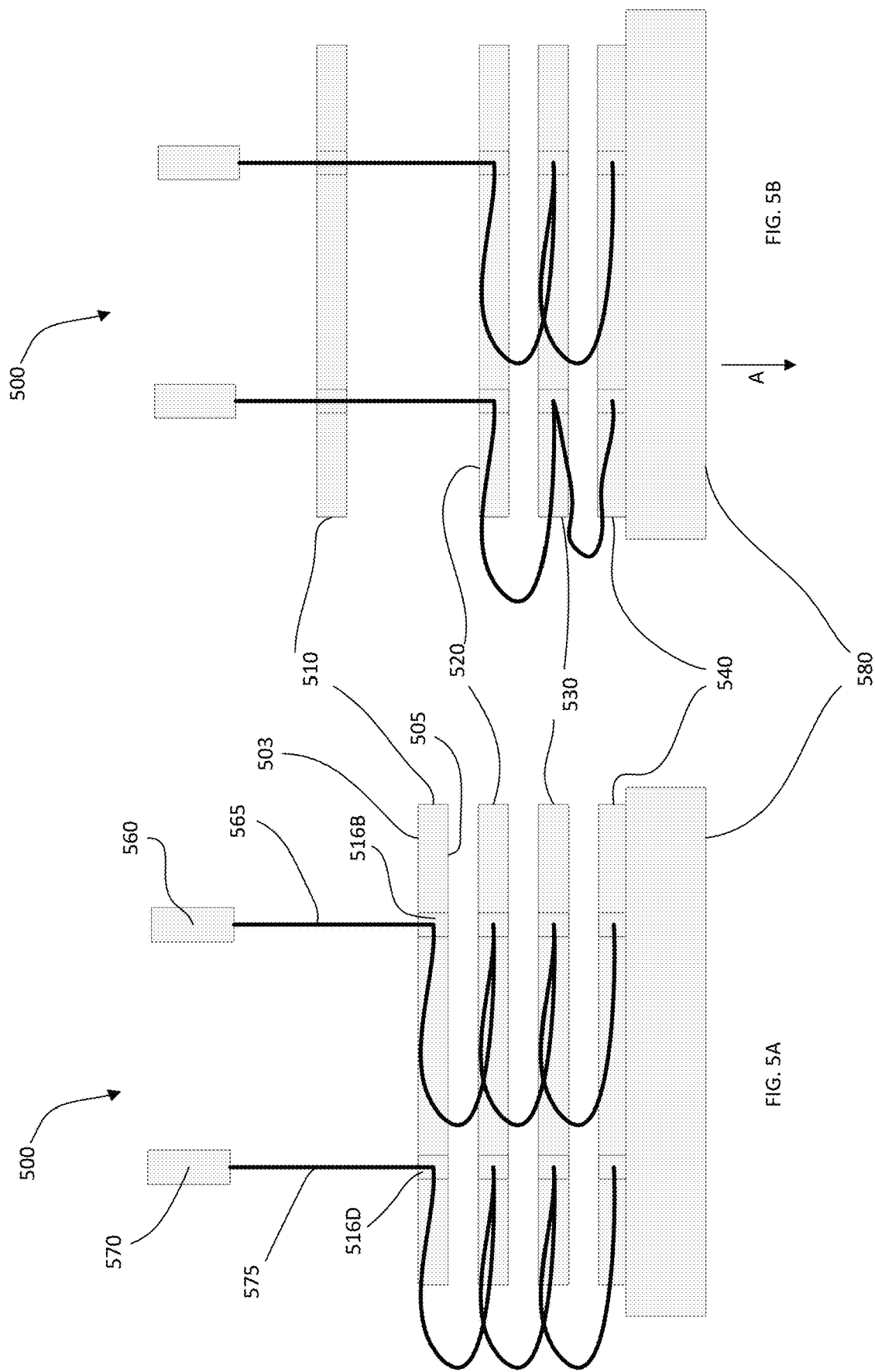

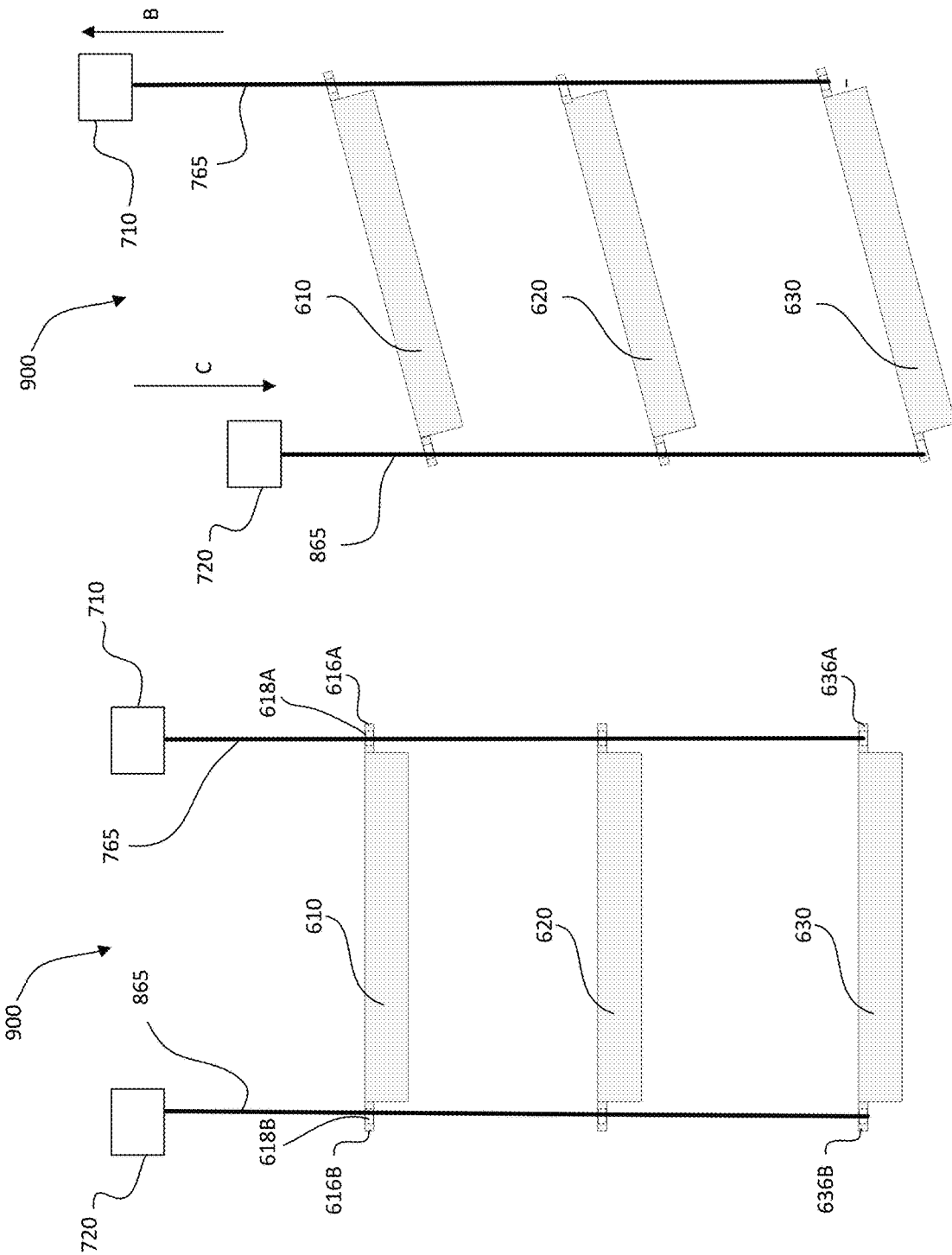

TILTING SOLAR PANELS FOR HIGH ALTITUDE BALLOONS

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable. Some systems may provide network access via a balloon network.

BRIEF SUMMARY

One aspect of the disclosure provides a high-altitude balloon system. The high-altitude balloon system includes an upper structure having a pulley, a lower structure, at least one solar panel suspended between the upper structure and the lower structure, and a first orientation control member connected, at a first end thereof, to a first transverse edge of the at least one solar panel and, at a second end thereof, to a second transverse edge of the at least one solar panel. The first orientation control member is wound about the pulley such that rotating the pulley changes the orientation of the at least one solar panel relative to the upper structure and the lower structure.

In one example, at least one solar panel comprises an array of solar panels. The first orientation control member is connected, at the first end, thereof, to a first transverse edge of a foremost solar panel of the array and, at the second end thereof, to a second transverse edge of the foremost solar panel of the array. Each solar panel of the array of the solar panels comprises a first bracket along a first transverse edge of the solar panel and a second bracket along a second transverse edge of the solar panel. The system further includes a second orientation control member coupled, at a first end thereof, to a first bracket of the foremost solar panel and, at a second end thereof, to a first bracket of an adjacent solar panel; and a third orientation control member coupled, at a first end thereof, to a second bracket of the foremost solar panel and, at a second end thereof, to a second bracket of the adjacent solar panel.

In an example, each of the first and second brackets of the foremost solar panel comprises a first aperture and a second aperture. The first end of the first orientation control member is coupled to the first aperture of the first bracket of the foremost solar panel and the second end of the first orientation control member is coupled to the first aperture of the second bracket of the foremost solar panel. The first end of the second orientation control member is coupled to the second aperture of the first bracket of the foremost solar panel and the second end of the second orientation control member is coupled to the first aperture of the first bracket of the adjacent solar panel. The first end of the third orientation control member is coupled to the second aperture of the second bracket of the foremost solar panel and the second end of the third orientation control member is coupled to the first aperture of the second bracket of the adjacent solar panel.

In one example, each solar panel of the array of the solar panels comprises a third bracket along the first transverse edge of the solar panel and a fourth bracket along the second transverse edge of the solar panel. A second orientation control member is coupled, at a first end thereof, to a first bracket of the foremost solar panel and, at a second end thereof, to a first bracket of an adjacent solar panel. A third orientation control member is coupled, at a first end thereof, to a second bracket of the foremost solar panel and, at a second end thereof, to a second bracket of the adjacent solar panel. A fourth orientation control member coupled, at a first end thereof, to a third bracket of the foremost solar panel and, at a second end thereof, to a third bracket of the adjacent solar panel. A fifth orientation control member is coupled, at a first end thereof, to a fourth bracket of the foremost solar panel and, at a second end thereof, to a fourth bracket of the adjacent solar panel.

In an example, the at least one solar panel comprises an array of solar panels. The first orientation control member is connected, at the first end, thereof, to a first transverse edge of a last solar panel of the array and, at the second end thereof, to a second transverse edge of the last solar panel of the array. Each solar panel of the array of solar panels comprises a first bracket along a first transverse edge of the solar panel and a second bracket along a second transverse edge of the solar panel. Each bracket of each solar panel of the array of solar panel comprises an aperture. Each bracket of each solar panel of the array is coupled to the first orientation control member.

In another example, a solar panel system includes a first support mechanism, a second support mechanism, at least one solar panel, a first orientation control member coupled, at a first end thereof, to the first support mechanism and, at a second end thereof, to the solar panel, and a second orientation control member coupled, at a first end thereof, to the second support mechanism and, at a second end thereof, to the solar panel. The first and second support mechanisms are configured to deploy or retract the first and second orientation control members, respectively, in an inverse relationship.

In another example, the at least one solar panel comprises an array of solar panels. The first and second orientation control members are coupled to a foremost solar panel of the plurality of solar panel. Each solar panel of the array of the solar panels comprises a first bracket along a first transverse edge of the solar panel and a second bracket along a second transverse edge of the solar panel. A third orientation control member is coupled, at a first end thereof, to a first bracket of the foremost solar panel and, at a second end thereof, to a first bracket of an adjacent solar panel. A fourth orientation control member is coupled, at a first end thereof, to a second bracket of the foremost solar panel and, at a second end thereof, to a second bracket of the adjacent solar panel.

In an example, each of the first and second brackets of the foremost solar panel comprises a first aperture and a second aperture. The first end of the first orientation control member is coupled to the first aperture of the first bracket of the foremost solar panel and the first end of the second orientation control member is coupled to the first aperture of the second bracket of the foremost solar panel. The first end of the third orientation control member is coupled to the second aperture of the first bracket of the foremost solar panel and the second end of the third orientation control member is coupled to the first aperture of the first bracket of the adjacent solar panel. The first end of the fourth orientation control member is coupled to the second aperture of the second bracket of the foremost solar panel and the second end of the fourth orientation control member is coupled to the first aperture of the second bracket of the adjacent solar panel.

In another example, at least one solar panel comprises an array of solar panels. The first orientation control member is connected, at the first end, thereof, to the first support mechanism and, at the second end thereof, to a first transverse edge of a last solar panel of the array. The second orientation control member is connected, at the first end thereof, to the second support mechanism and, at the second end thereof, to a second transverse edge of the last solar panel of the array. Each solar panel of the array of solar panels comprises a first bracket along a first transverse edge of the solar panel and a second bracket along a second transverse edge of the solar panel. Each bracket of each solar panel of the array of solar panel comprises an aperture. Each bracket of each solar panel of the array at the first transverse edge of each solar panel is coupled to the first orientation control member. Each bracket of each solar panel of the array at the second transverse edge of each solar panel is coupled to the second orientation control member.

BRIEF DESCRIPTION OF THE DRAWINGS

FIG. 5A is a schematic example of a solar panel array and orientation control members with the array in a stowed condition in accordance with aspects of the present disclosure.

FIG. 5B is schematic example of a solar panel array in an intermediate stage of deployment in accordance with aspects of the present disclosure.

FIG. 9A schematically illustrates a solar panel array in a fully deployed condition with the solar panels in a horizontal orientation with another example of the orientation members in accordance with aspects of the disclosure.

FIG. 9B schematically illustrates the solar panel array of FIG. 9A in a fully deployed condition with the solar panels in a tilted orientation in accordance with aspects of the disclosure.

DETAILED DESCRIPTION

Overview

Figure 1:
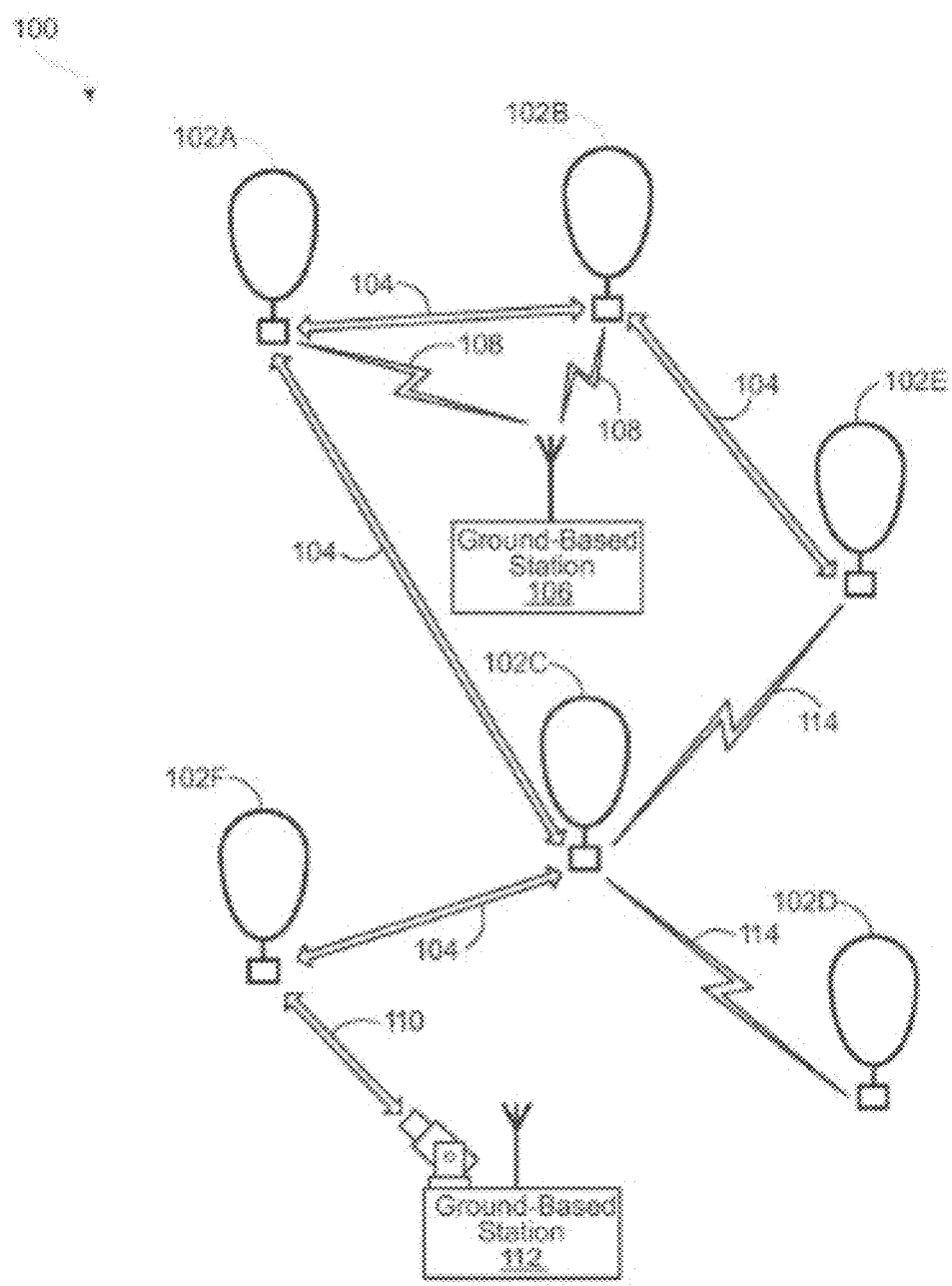
FIG. 1 is a functional diagram of a network in accordance with to aspects of the disclosure.

The technology relates to high altitude balloons which utilize solar panels to generate power. These solar panels can be deployed vertically with a generally fixed orientation. However, in order to increase the amount of light reaching the solar panels as the relative position of the sun and the solar panels changes during the day, the solar panels may be tilted at a desired angle between and including a horizontal position relative to the direction of gravity, i.e., 0°, to a vertical position, relative to the direction of gravity, i.e., 90°. In addition, the solar panels may also be configured to rotate in both, clockwise and counterclockwise, directions relative to the horizontal position. Such multi-axis tilting capability would enable the solar panels to track the movement of the sun and result in an optimal solar power collection.

To achieve such a deployment of the solar panels, a high altitude balloon may include a payload having an upper structure, a lower structure and a platform coupled to the lower structure, between the upper and the lower structure. The upper and the lower structures may be connected by a series of tension lines which are routed to a spool with a torsional damper. An electro-mechanical or pyrotechnic device for initiating and/or controlling the rotational movement of the spool of the tension lines may be attached to the spool. Prior to deployment, an array of solar panels may be in a stowed condition, supported on the platform. The solar panels may be stacked face to back in a generally horizontal orientation relative to the direction of gravity or the ground surface.

Each panel may include a first bracket bonded or fastened at or in the vicinity of a first transverse edge and a second bracket bonded or fastened at or in the vicinity of a second transverse edge, opposite the first transverse edge, for connecting the panel to the tension line. In one example, the first bracket may be installed at the midpoint of the width of the first transverse edge of the solar panel and the second bracket may be installed at the midpoint of the width of the second transverse edge of the solar panel.

In another example, a first bracket may be bonded or fastened at or in the vicinity of the first transverse edge at about one-third width from a first lateral edge and a second bracket may be bonded or fastened at or in the vicinity of the first transverse edge at about one-third width from a second lateral edge, opposite the first lateral edge. Likewise, a third bracket may be bonded or fastened at or in the vicinity of the second transverse edge at about one-third width from the first lateral edge and a fourth bracket may be bonded or fastened at or in the vicinity of the second transverse edge at about one-third width from the second lateral edge. All the first, second, third and fourth brackets may be installed at identical locations for each of the solar panels of the array.

The system may further include an orientation control member connected to or in the vicinity of the first transverse edge of the foremost solar panel and to or in the vicinity of the second transverse edge of the foremost solar panel. The orientation control member may be routed about a pulley, for example. The orientation control member may engage the pulley, for example, via friction, such that a rotation of the pulley causes the orientation control member to move along with the pulley. The rotational movement of the pulley may be controlled by an actuator and a control mechanism.

Alternatively, the system may include a first orientation control member connected at a first end to the first and/or second brackets at or in the vicinity of the first transverse edge of the foremost solar panel and at a second end to the third and/or fourth brackets at or in the vicinity of the second transverse edge of the foremost panel. The system may further include multiple orientation control members, each orientation member either connecting the first lateral edges (or in the vicinity thereof) of two adjacent solar panels or connecting the second lateral edges (or in the vicinity thereof) of two adjacent solar panels.

In yet another example, one or more orientation members may be connected to all the solar panels to the first and/or second brackets at or in the vicinity of the first transverse edges of all the panels. Additionally, one or more orientation members may be connected to all the solar panels to the third and/or fourth brackets at or in the vicinity of the second transverse edges of all the panels. A pulley, as described above, may be eliminated in this example.

When the platform and the lower structure descend to a distance equal to the length of the orientation control member(s) between the foremost solar panel and the second solar panel, the second solar panel stops its descent, while the rest of the panels continue their descent. Once the remaining stack is sufficiently far from the second panel, the second panel hangs horizontally from the flexible member, suspended between the first/second and third/fourth brackets. Thus, as the platform and the lower structure continue to descend, each successive panel begins to hang from the panel above and deploy off the stack until all the panels have deployed horizontally and generally parallel to one another. At this stage, all of the solar panels are oriented horizontally with the solar cells of a solar panel facing the back of the solar panel above it.

The pulley may then be rotated to achieve a desired orientation of the solar panels. For instance, the actuator may rotate the pulley in a counterclockwise direction. As a result, the orientation control member on a first side of the pulley is pulled up, thereby pulling the first transverse edge of the foremost solar panel. At the same time, the line breath taken up on the first side is released to the second side, which permits the second transverse edge of the solar panel to tilt downward. The solar panel thus tilts in a counterclockwise direction. The pulley may be rotated to achieve a desired angular tilt of the foremost solar panel. Since the orientation member(s) are further connected to the second and subsequent solar panels, the second and subsequent solar panels also tilt in a symmetrical manner and remain generally parallel to one another. When the pulley is rotated in a clockwise direction, on the other hand, by the actuator, the solar panels tilt in the clockwise direction.

The features described above allow for the deployment of the solar panels with a capability of tilting the solar panels to optimally track the movement of the sun, resulting in an optimal solar power collection. For instance, the solar panels may be initially deployed vertically when the sun is at the horizon. The solar panels may be tilted to track the sun until the sun is at the zenith and the solar panels are all horizontal. The solar panels may be then tilted in an opposite direction to further track the movement of the sun.

Example Balloon Network

FIG. 1 depicts an example network 100 in which a balloon may be used. In this example, network 100 may be considered a "balloon network." The balloon network 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
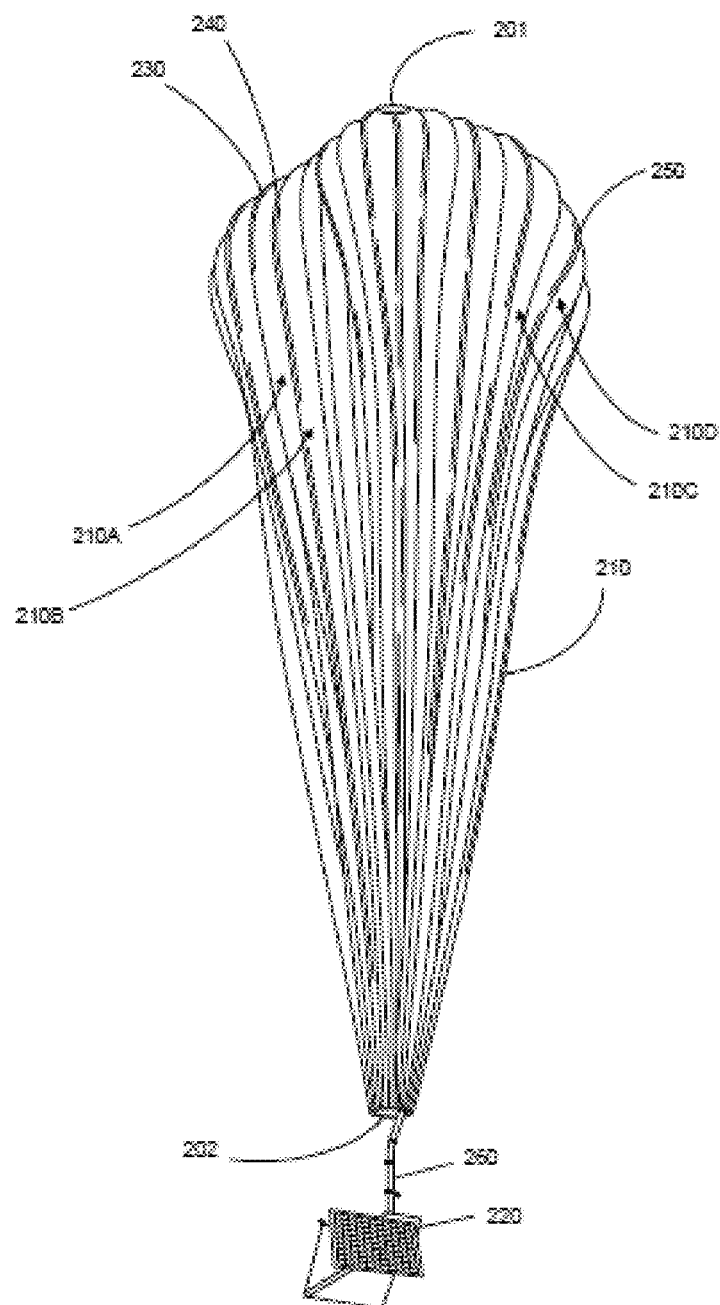
FIG. 2 is an example of a balloon in accordance with aspects of the disclosure.

FIG. 2 is an example stratospheric balloon 200, which may represent any of the balloons of balloon network 100. As shown, the balloon 200 includes a balloon envelope 210, a payload 220 and a plurality of tendons 230, 240 and 250 attached to the balloon envelope 210. In this example, balloon envelope 210 may be inflated to a desired level, but not yet pressurized.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical or radio communication system, a navigation system, a positioning system, a lighting system, an altitude control system and a power supply to supply power to various components of balloon 200. The electric power required to operate different components of the payload 220 may be supplied by the solar panels described below.

Figure 3:
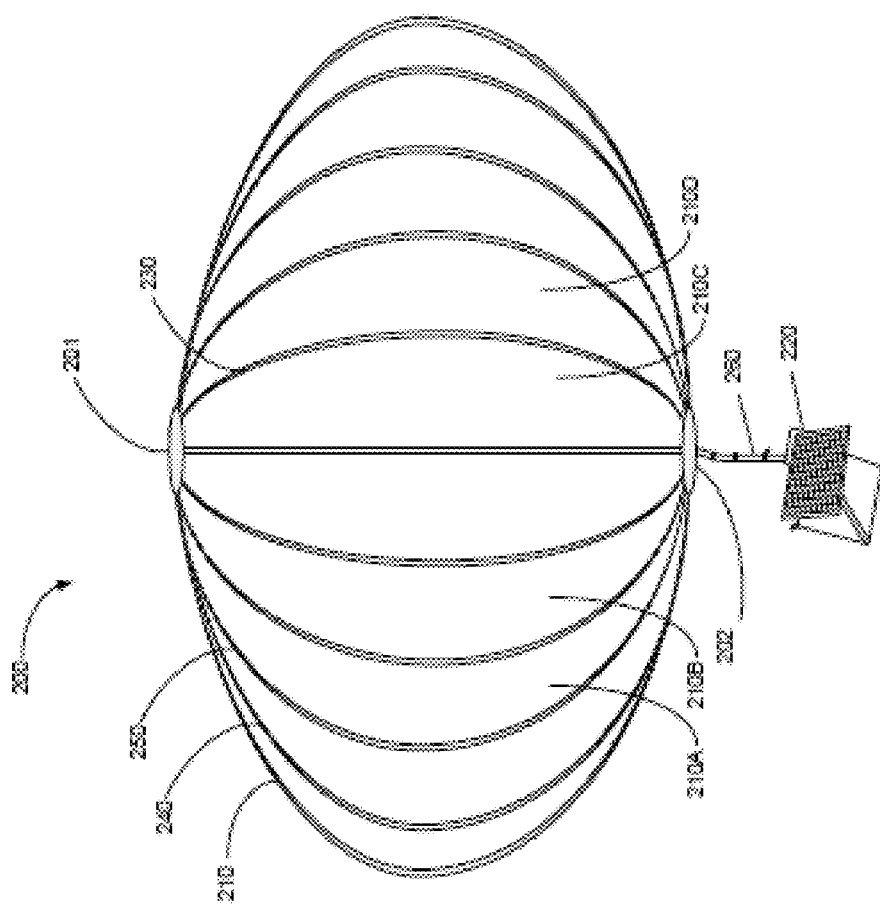
FIG. 3 is an example of a balloon in accordance with aspects of the disclosure.

FIG. 2 depicts the balloon envelope 210 inflated with lift gas close to ground level, for instance, at atmospheric pressure. As the balloon rises and the atmospheric pressure drops, the lift gas within the balloon envelope expands, changing the shape of the balloon envelope. Eventually, for instance, when the balloon envelope reaches the stratosphere, the lift gas in the balloon envelope causes the balloon envelope to form more of a rounded pumpkin shape depicted in FIG. 3.

Solar Panels

Figure 4B:
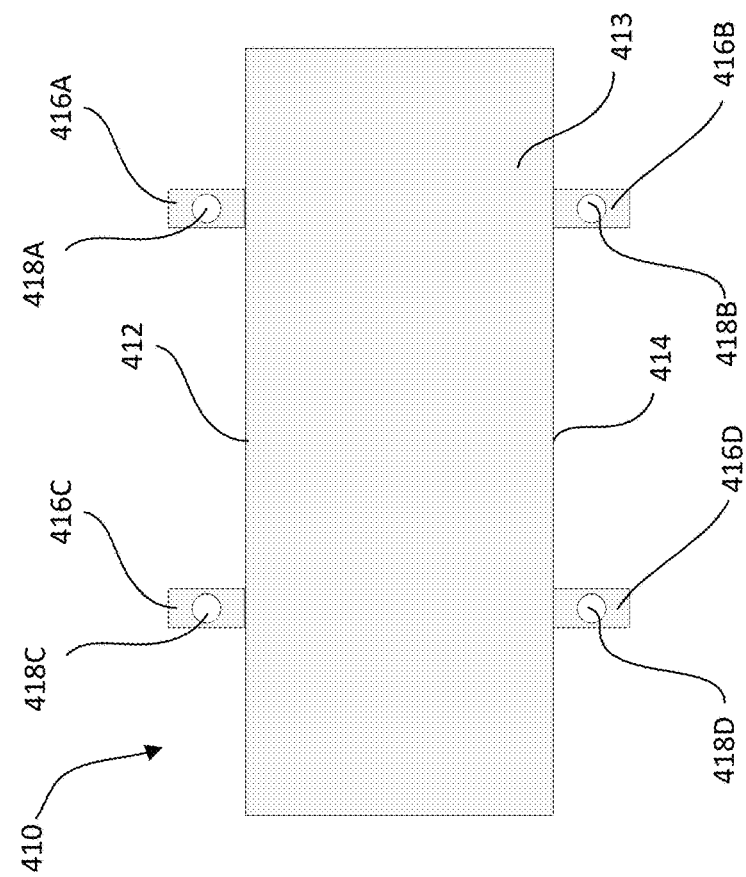
FIG. 4B is another example of a solar panel in accordance with aspects of the present disclosure.
Figure 4A:
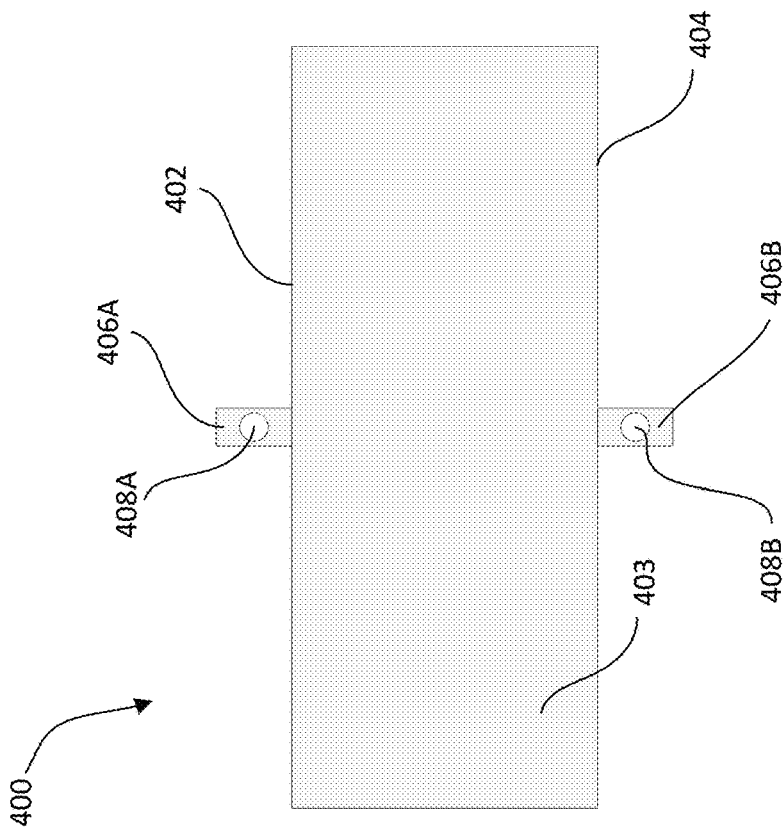
FIG. 4A is an example of a solar panel in accordance with aspects of the present disclosure.

FIG. 4A illustrates a top view of an example of a solar panel 400 according to the disclosure. For the sake of clarity, solar cells are not illustrated in these drawings, though solar panel 400 may include a plurality of solar cells. The solar panel 400 has a first transverse edge 402, a second transverse edge 404, a front surface 403 and a rear surface (not shown). In one example, the front surface 403 includes the solar cells. The solar panel 400 includes a first bracket 406A at the first transverse edge 402 and a second bracket 406B at the second transverse edge 404. Each of the first and second brackets 406A, 406B has a through-aperture 408A, 408B defined therethrough, respectively. In one example, the first bracket 406A is positioned at or in vicinity of the midpoint of the transverse edge 402 and the second bracket 406B is positioned at or in vicinity of the midpoint of the transverse edge 404. In other examples, the first and second brackets 406A, 406B may be located at other positions along the transverse edges 402, 404. In still other examples, the first bracket 406A may be arranged at a first lateral edge (generally transverse to the first and second transverse edges) of the solar panel 400 and a second bracket 406B may be arranged at a second lateral edge (generally transverse to the first and second transverse edges and opposite the first lateral edge) of the solar panel 400.

FIG. 4B illustrates a top view of another example of a solar panel 410 according to the disclosure. Again, for the sake of clarity, solar cells are not illustrated in these drawings, though the solar panel 410 may include a plurality of solar cells. The solar panel 410 has a first transverse edge 412, a second transverse edge 414, a front surface 413 and a rear surface (not shown). In one example, the front surface 413 includes the solar cells. The solar panel 410 includes a first bracket 416A and a second bracket 416C at the first transverse edge 412 and a third bracket 416B and a fourth bracket 416D at the second transverse edge 414. Each of the first, second, third and fourth brackets 416A, 416C, 416B, 416D has a through-aperture 418A, 418C, 418B, 418D defined therethrough, respectively. In one example, the first bracket 416A is positioned at about one-third of the length of the transverse edge 412 (i.e., width of the solar panel 410) and the second bracket 416C is positioned at about two-third of the length of the transverse edge 412. Likewise, the third bracket 416B is positioned at about one-third of the length of the transverse edge 414 and the fourth bracket 416D is positioned at about two-third of the length of the transverse edge 414. In other examples, the first, second, third, and fourth brackets 416A, 416C, 416B, 416D may be located at other positions along the transverse edges 412, 414. In still other examples, the first, second, third, and fourth brackets 416A, 416C, 416B, 416D may be located along first and second lateral edges of the solar panel 410.

The brackets 406A, 406B, 416A, 416B, 416C, 416D may be secured or fastened to the solar panels 400, 410, respectively, using, by way of non-limiting examples, glues, adhesives, and fasteners such as screws and bolts. In other examples, one or more of the brackets 406A, 406B, 416A, 416B, 416C, 416D may include more than one respective apertures 408A, 408B, 418A, 418B, 418C, 418D.

FIG. 5A illustrates an example of a solar panel array system 500 in a side view. The system 500 includes an array of solar panels 510, 520, 530, 540 resting on a platform 580 in an initial stowed configuration of the array. A front surface 503 of the foremost or topmost solar panel 510 faces upwards in the example while a rear surface 505 of the foremost solar panel faces a front surface (not labeled) of the adjacent solar panel 520. Likewise, a rear surface (not labeled) of the solar panel 520 faces a front surface (not labeled) of its adjacent solar panel 530. While the illustration include four solar panels in the array, it will be understood that in other examples, the array may include more than four or less than four solar panels. The solar panels 510, 520, 530, 540 may be configured the same as or similarly to the solar panel 410 of FIG. 4B. In another example, the solar panels 510, 520, 530, 540 may be configured the same as or similarly to the solar panel 400 of FIG. 4A.

In the illustrated example, the system 500 further includes a first support structure 560, a second support structure 570, and a platform 580. A first orientation control member 565 extends from the first support structure 560 and a second orientation control member 575 extends from the second support structure 570. In one example, the first and second support structures 560, 570 may each take the form of a pulley and the first and second orientation control members 565, 575 may be wound about the first and second support structures 560, 570, respectively. The solar panels 510, 520, 530, 540 are coupled to first orientation control member 565 and second orientation control member 575 at their respective brackets 516B, 516D along the second transverse edges of the respective solar panels as well as at their respective brackets (not visible in the drawing) along the first transverse edges of the respective solar panels. A first segment of the first orientation control member 565 between the first support structure 560 and the foremost solar panel 510 has a first length. Likewise, a first segment of the second orientation control member 575 between the second support structure 570 and the foremost solar panel 510 has a second length. The first length is equal to the second length in one example. The orientation control members 565, 575 may take the form of a rope, a wire or a cable and may be made of any suitable material such as a metal, nylon and CFRP, by way of non-limiting examples.

The solar panels 510, 520, 530, 540 are so coupled with the first and second orientation control members 560, 570 that any relative movement between the solar panels and the orientation control members is constrained. For example, each of the corresponding couplings of the brackets 516B, 516D and the first and second orientation control members 560, 570 defines a pin-joint. The array of the solar panels 510, 520, 530, 540 rests on the platform 580 in an initial stowed configuration of the array.

FIG. 5B illustrates an intermediate stage of deployment of the array of the solar panels 510, 520, 530, 540. In one example, the platform 580 is caused to move downward relative to the first and second upper structures 560, 570 as illustrated by an arrow A. As the platform 580 descends by a distance equal to or greater than the first and second lengths of the first and second orientation control members 565, 575, the first segments of the first and second orientation members 565, 575 become taut and arrest further descent of the foremost solar panel 510. The rest of the solar panels 520, 530, 540 of the array continue their descent along with the platform 580.

When the platform 580 further descends by a distance equal to or greater than the lengths of the segments of the first and second orientation control members 565, 575 between the foremost solar panel 510 and the adjacent solar panel 520, these segments become taut and arrest further descent of the adjacent solar panel 520. The remaining solar panels 530, 540 continue their descent along with the platform 580. The process continues until all the solar panels 510, 520, 530, 540 have been deployed. In an initial stage of deployment, all the solar panels 510, 520, 530, 540 have a horizontal orientation.

Figure 6B:
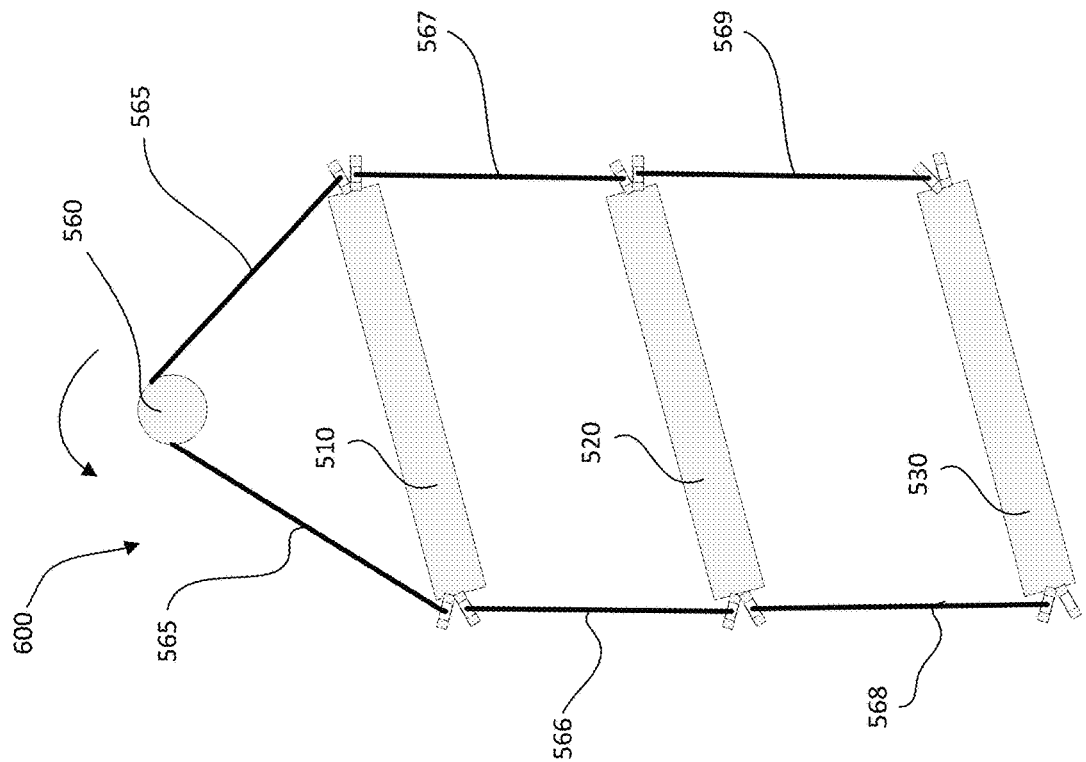
FIG. 6B schematically illustrates the solar panel array of FIG. 6A in a fully deployed condition with the solar panels in a tilted orientation in accordance with aspects of the disclosure.
Figure 6A:
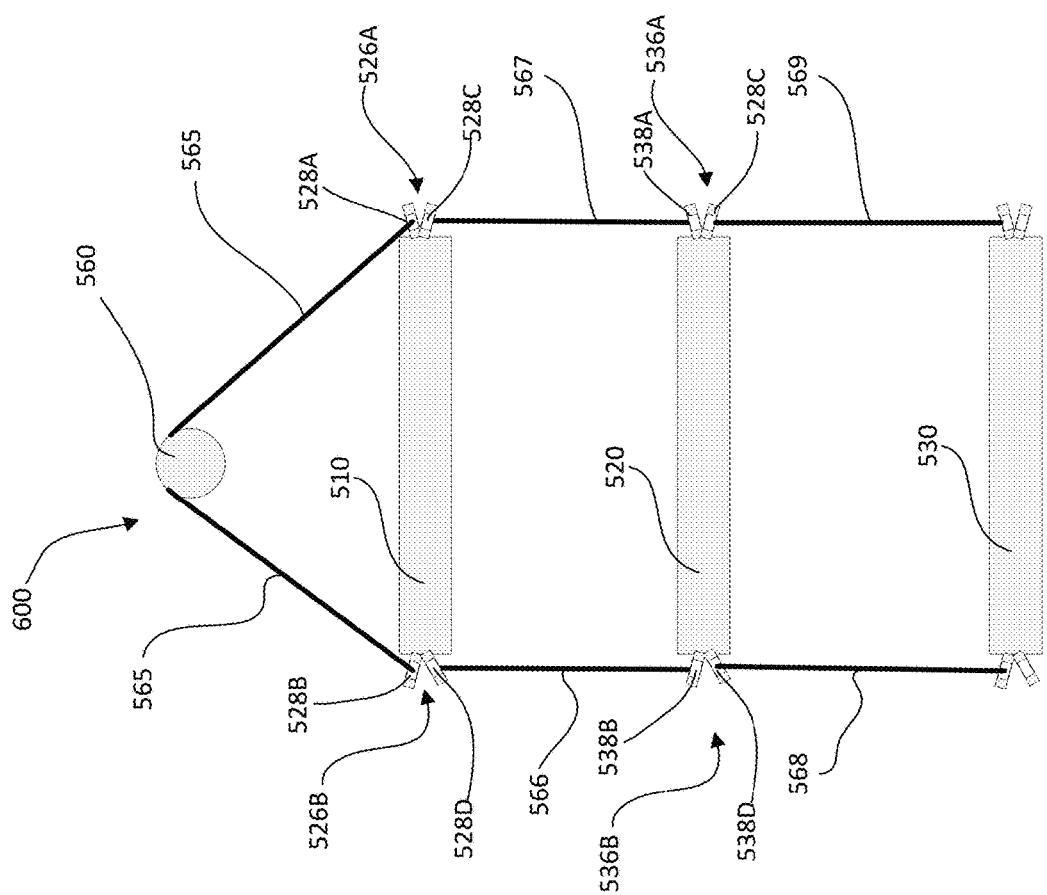
FIG. 6A schematically illustrates an example of a solar panel array in a fully deployed condition with the solar panels in a horizontal orientation in accordance with aspects of the disclosure.

FIG. 6A schematically illustrates a side view of an array 600 of solar panels 510, 520, 530 in an initial deployed configuration. In the illustrated example, the first support structure 560 is visible in the drawing and takes the form of a pulley. The second support structure 570 of FIG. 5A is behind the first support structure 560 and is therefore not visible in the side view illustrated in FIG. 6A. Likewise, the second orientation control member 575 of FIG. 5A is behind the first orientation control member 565 and is therefore not visible in the side view illustrated in FIG. 6A. The first orientation control member 565 is wound about the first support structure or pulley 560 such that there is no relative movement between the first orientation control member 565 and the first pulley 560. In other words, if the first pulley 560 is rotated, the first orientation control member 565 on one side of the first pulley 560 is pulled up, while the first orientation control member 565 on the other side of the first pulley 560 is slackened.

The solar panel 510 is generally similar to the solar panel 410 of FIG. 4B in the illustrated example. In another example, the solar panel 510 may be generally similar to the solar panel 400 of FIG. 4A. The solar panel 510 includes brackets 526A, 526B, 526C, 526D along its transverse edges, similar to the brackets 416A, 416B, 416C, 416D of FIG. 4B. The bracket 526A includes first and second apertures 528A, 528C and the bracket 526B includes first and second apertures 528B, 528D in the illustrated example. It will be understood that the brackets 526A, 526B may include any other connection mechanism, instead of apertures 528A, 528B, 528C, 528D to couple to the first orientation control member 565.

In the illustrated example, a first end of the first orientation member 565 is coupled to the aperture 528A along one transverse edge of the solar panel 510 and a second end of the first orientation member 565 is coupled to the aperture 528B along the other transverse edge of the solar panel 510. A first end of an orientation member 566 is coupled to the aperture 528D of the foremost solar panel 510 while a second end of the orientation member 566 is coupled to an aperture 538B of a bracket 536B of the adjacent solar panel 520. Likewise, a first end of an orientation member 567 is coupled to the aperture 528C of the foremost solar panel 510 while a second end of the orientation member 567 is coupled to an aperture 538A of a bracket 536A of the adjacent solar panel 520. In one example, the first orientation member 565 and the orientation control member 567 may include corresponding mechanical stoppers to engage the apertures 528A, 528B, 528C, 528D, 538A, 538B. The mechanical stoppers serve to inhibit relative sliding motion between the first orientation control member 565 and the orientation control member 567 and the corresponding brackets. As with orientation control members 565, 575, orientation control members 566, 567 may also take the form of a rope, a wire or a cable and may be made of any suitable material such as a metal, nylon and CFRP, by way of non-limiting examples.

The first and second apertures 528A, 528B, 528C, 528D, 538A, 538B, 538C, 538D may also be implemented as a single aperture or a single mechanism such that there are two distinct connections: one between the bracket 526A and the orientation control member 565 and the other between the bracket 526A and the orientation control member 567, for example. The length of the orientation control member 566 is equal to the length of the orientation control member 567 in this example. Orientation control members 568, 569 are coupled similarly between the solar panels 520, 530.

FIG. 6B illustrates how the solar panels 510, 520, 530 of the array 600 may be titled from their initial horizontal orientation. In the illustrated stage, the first pulley 560 and the second pulley 570 (not shown) are rotated in a counter-clockwise direction. As the first pulley 560 rotates, the orientation control member 565 and the orientation control member 575 (not shown) are pulled upward toward the first pulley 565 and the second pulley 570 (not shown) on one side (right side in the drawing) of the first and second pulleys 560, 570 while the orientation control member 565 and the orientation control member 575 (not shown) are allowed to move downward away from the first pulley 565 and the second pulley 570 on the other side (left side in the drawing) of the first and second pulleys 560, 570. As a result, the transverse edge of the foremost solar panel 510 is pulled upward while the transverse edge of the foremost solar panel 510 is permitted to tilt downward relative to the first pulley 560. The degree of tilting of the foremost solar panel 510 is generally proportional to the rotational movement of the first pulley 560 and the second pulley 570. The greater the rotational movement of the first pulley 560 and the second pulley 570, the greater the movement of the first orientation control member 565 and consequently greater the tilt of the foremost solar panel 510.

As one transverse edge of the foremost solar panel 510 is pulled upward, the orientation control member 567 and the orientation control member behind the orientation control member 567 are also pulled upward, thereby pulling a corresponding transverse edge of the adjacent solar panel 567. Simultaneously, as the other transverse edge of the foremost solar panel 510 is permitted to tilt downward, the orientation control member 566 and the orientation control member behind the orientation member 566 are slackened, which permits the other corresponding transverse edge of the adjacent solar panel 520 to tilt downward. Since the orientation control members 566, 567 have equal lengths in this example, the adjacent solar panel 520 will tilt to the same extent as that of the foremost solar panel 510. The orientation control members 568, 569 are similarly slackened and pulled upward, respectively, thereby tilting the solar panel 530 in a similar manner.

If, on the other hand, the first pulley 560 and the second pulley 570 (not shown) are rotated in a clockwise direction, the first orientation control member 665 on the other side (left side in the drawing) of the first pulley 560 is pulled upward toward the first pulley 560 and the first orientation control member 665 on the one side (right side in the drawing) is slackened. As a result, the foremost solar panel 510 as well as the other solar panels 520, 530 are tilted in a direction opposite to the one illustrated in FIG. 6B. The second orientation control member 575 behaves in a manner similar to that of the first orientation control member 565.

Figure 7B:
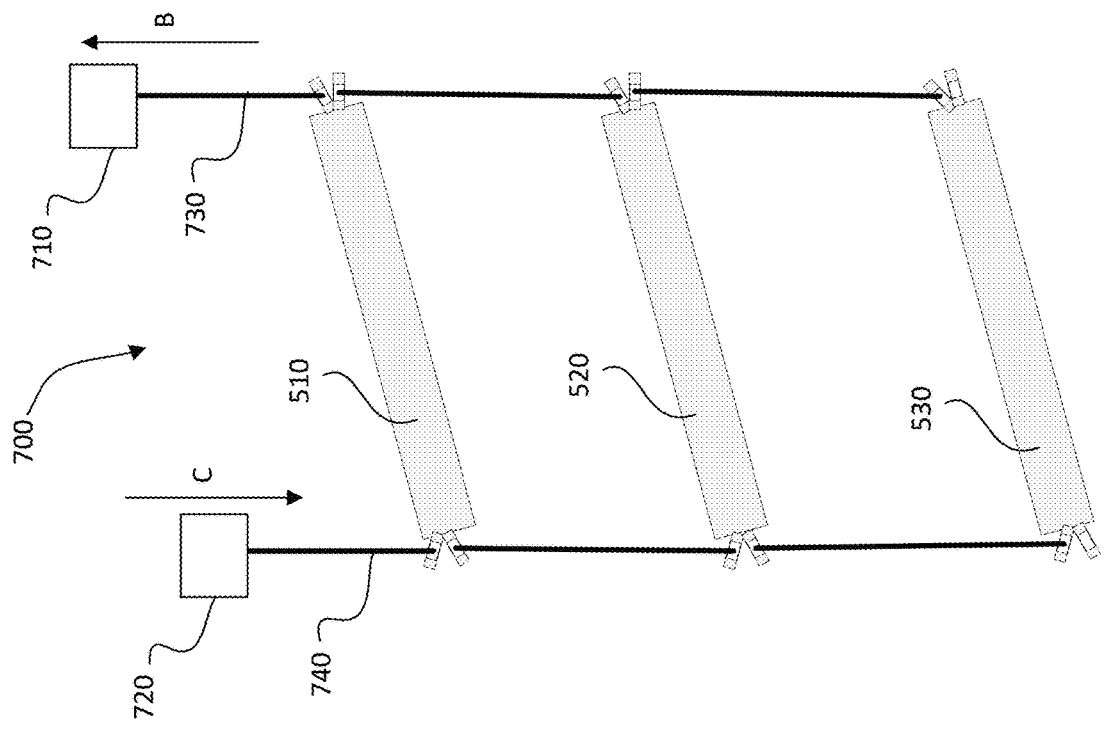
FIG. 7B schematically illustrates the solar panel array of FIG. 7A in a fully deployed condition with the solar panels in a tilted orientation in accordance with aspects of the disclosure.
Figure 7A:
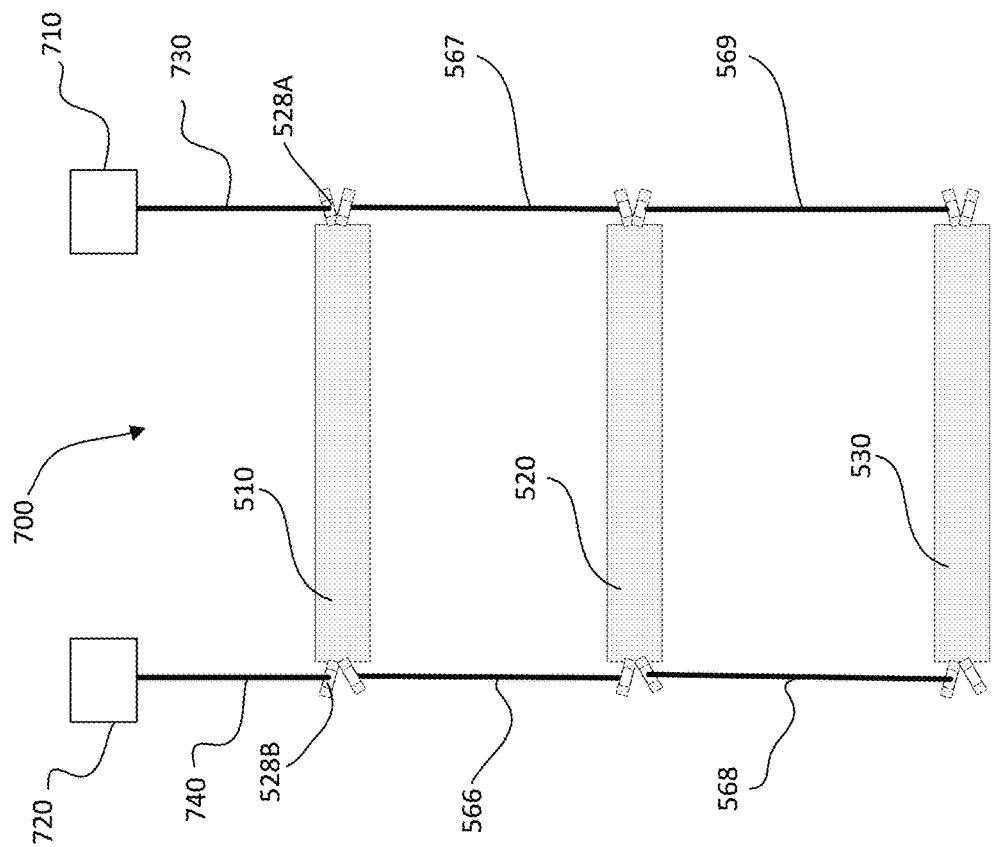
FIG. 7A schematically illustrates another example of a solar panel array in a fully deployed condition with the solar panels in a horizontal orientation with another example of the orientation members in accordance with aspects of the disclosure.

FIG. 7A illustrates another example of an array 700 of solar panels 610, 620, 630 generally similar to the example of FIG. 6A with some differences as noted below. The example of FIG. 7A does not include the first pulley 560, the second pulley 570, the first orientation control member 565, and the second orientation control member 575. Instead, the array 700 includes a first support mechanism 710 and a second support mechanism 720. A first orientation control member 730 is coupled at a first end to the first support mechanism 710 and at a second end to the aperture 528A of the foremost solar panel 510 at one transverse edge. Likewise, a second orientation control member 740 is coupled at a first end to the second support mechanism 720 and at a second end to the aperture 528B of the foremost solar panel 510 at the other transverse edge. The orientation control members 730, 740 may take the form of a rope, a wire or a cable and may be made of any suitable material such as a metal, nylon and CFRP, by way of non-limiting examples.

The first and second support mechanisms 710, 720 may each take the form a winch in one example. In another example, the first and second support mechanism 710, 720 may take the form of a linear motor. The first and second support mechanisms 710, 720 are configured to retract or deploy the corresponding first and second orientation members 730, 740, respectively, in an inverse relationship. For instance, if the first support mechanism 710 retracts the first orientation control member 730, the second support mechanism 720 deploys the second orientation control member 740 and vice versa. In one example, the first and second support mechanisms 710, 720 are configured to move upward or downward, thereby retracting or deploying the corresponding first and second orientation control members 730, 740.

In another example, the first and second support mechanisms 710, 720 are configured to shorten or lengthen the effective lengths of the corresponding first and second orientation control members 730, 740 between the first and second support mechanisms 710, 720 and the foremost solar panel 510. In one example, the effective lengths of the first and second orientation control members 730, 740 between the first and second support mechanisms and the foremost solar panel 510 may be shortened by winding the first and second orientation control members 730, 740 around the first and second support mechanisms 710, 720, respectively. Conversely, the effective lengths of the first and second orientation control members 730, 740 between the first and second support mechanism and the foremost solar panel 510 may be lengthened by releasing the first and second orientation control members 730, 740 from the first and second support mechanisms 710, 720, respectively.

In yet another example, the first and second support mechanism 710, 720 in the form of linear motors may move upward or downward. If one of the first and second support mechanisms 710, 720 moves upward, the corresponding one of the first and second orientation control member 730, 740 is pulled upward. Simultaneously, the other of the first and second support mechanisms 710, 720 moves downward, the corresponding one of the first and second orientation control members 730, 740 is permitted to move downward, for example because of gravity acting on the corresponding orientation control member as well as on the corresponding transverse edge of the foremost solar panel 510.

FIG. 7B illustrates the array 700 with the solar panels 510, 520, 530 in a tilted configuration. The first support mechanism 710 is moved upward as illustrated by an arrow B, thereby pulling the first orientation control member 730 and the associated transverse edge of the foremost solar panel 510 upward. Contemporaneously, the second support mechanism 720 is moved downward as illustrated by an arrow C, thereby permitting the second orientation control member 740 and the associated transverse edge of the foremost solar panel 510 to move downward. In the example where the first and second support mechanisms 710, 720 do not move from their position, the arrows B, C represent effectively shortening and lengthening of the effective lengths of the corresponding orientation control members 730, 740. For instance, if the first support mechanism 710 is a winch, the arrow B represents winding the first orientation control member 730 on the first support mechanism 710, thereby shortening the effective length of the first orientation control member 730 between the first support mechanism 710 and the foremost solar panel 510, thereby pulling the associated transverse edge of the foremost solar panel 510. Simultaneously, the arrow C represents unwinding of the second orientation control member 740 from the second support mechanism 720, thereby lengthening the effective length of the second orientation control member 740 between the second support mechanism 720 and the foremost solar panel 510, thereby permitting the associated transverse edge of the foremost solar panel 510 to move downward.

The tilting of the foremost solar panel 510 causes the solar panels 520, 530 to tilt as described above with reference to FIG. 6B. The extent of the tilting of the solar panels 510, 520, 530 is generally proportional to the upward or downward movement (or the rotational movement) of the first and second support control mechanisms 710, 720. The solar panels 510, 520, 530 may be tilted in a direction opposite to that illustrated in FIG. 7B by reversing the direction of movement or rotation of the first and second support mechanisms 710, 720. More particularly, the first support mechanism 710 moves downward, thereby permitting the first orientation control member 730 and the associated transverse edge of the foremost solar panel 510 to move downward. Simultaneously the second support mechanism 720 moves upward, thereby pulling the second orientation control member 740 and the associated transverse edge of the foremost solar panel 510 upward. The solar panels 520, 530 follow the tilting movement of the foremost solar panel 510.

Figure 8B:
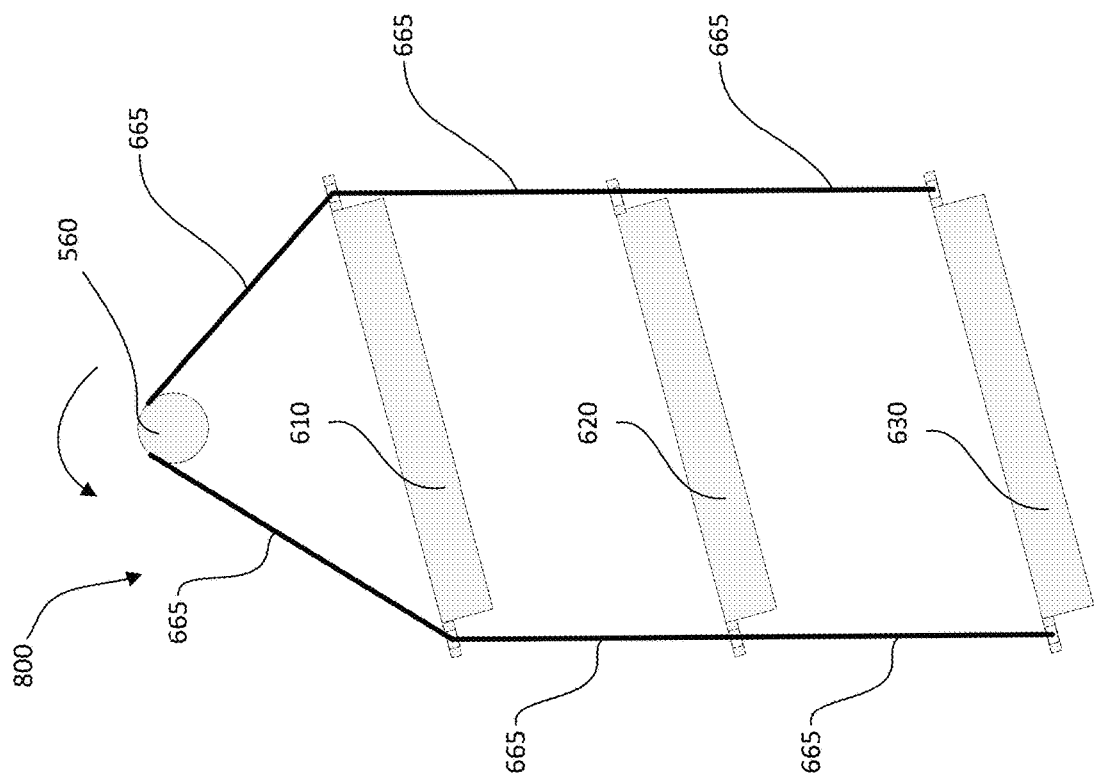
FIG. 8B schematically illustrates the solar panel array of FIG. 8A in a fully deployed condition with the solar panels in a tilted orientation in accordance with aspects of the disclosure.
Figure 8A:
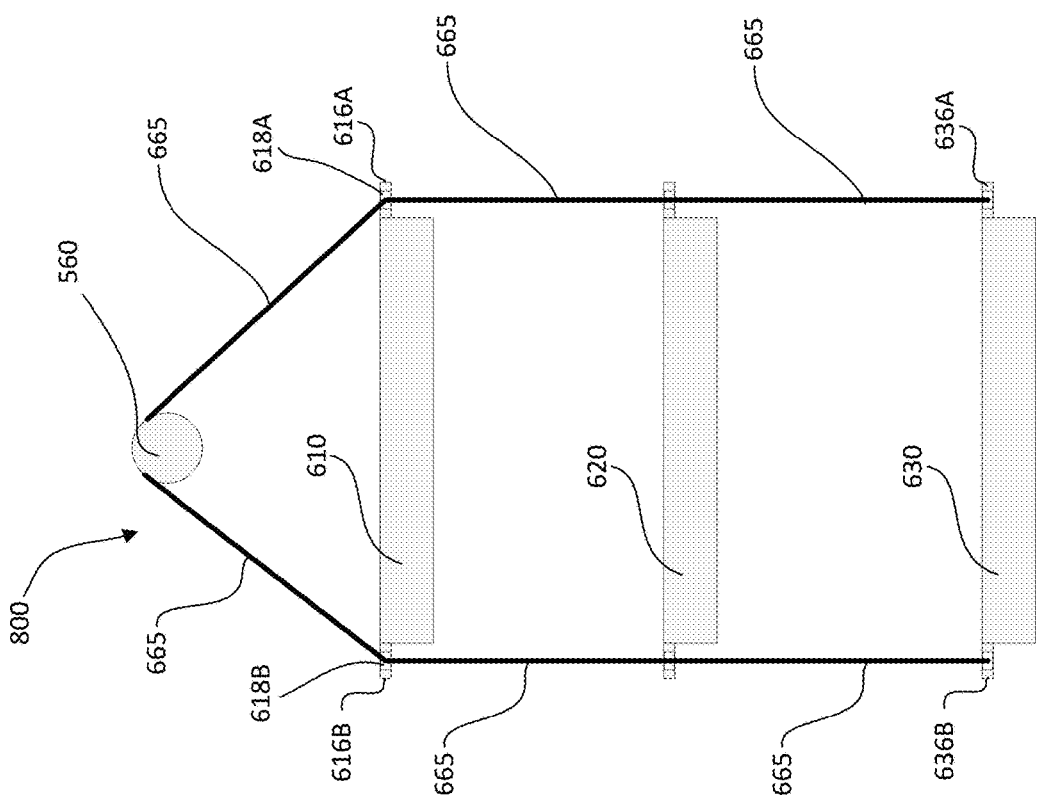
FIG. 8A schematically illustrates a solar panel array in a fully deployed condition with the solar panels in a horizontal orientation with yet another example of orientation control members in accordance with aspects of the disclosure.

FIG. 8A illustrates an example of an array 800 of solar panels 610, 620, 630 generally similar to the example of FIG. 7A with some differences as noted below. The solar panels 610, 620, 630 includes brackets 616A, 616B similar to brackets 416A, 416B of FIG. 4B. While each of the brackets 526A, 526B, 526C, 526D of FIG. 6A includes two apertures 528A, 528B, 528C, 528D, for example, each of the brackets 616A, 616B of FIG. 8A includes a single aperture 618A, 618B, respectively. Furthermore, the example of FIG. 8A includes a single first orientation control member 665 and a single second orientation control behind the first orientation control member 665 in the drawing (and therefore not visible) coupled to all of the solar panels 610, 620, 630. More particularly, a first end of the first orientation control member 665 is coupled to a bracket 636A on one transverse edge of the last solar panel 630 while a second end of the first orientation control member 665 is coupled to a bracket 636B at the second transverse edge of the last solar panel 630. The solar panels 610, 620 are also coupled to the first orientation control member 665 such that the solar panels 610, 620, 630 maintain a predetermined distance from one another when fully deployed. Each coupling of the brackets 616A, 616B, 636A, 636B, for example, and the first orientation control member 665 defines a pin-joint such that there is no relative movement between the brackets 616A, 616B, 636A, 636B and the first orientation control member 665. The single second orientation control member is similarly coupled to the all of the solar panels 610, 620, 630.

Referring now to FIG. 8B, when the first pulley 560 (and the second pulley 570) is rotated in a counterclockwise direction, the first orientation control member 665 (and the second orientation control member 575) on one side (right side in the drawing) is pulled upward toward the first pulley 560 while the first orientation control member 665 on the other side (left side in the drawing) is slackened. As the first orientation control member 665 on the one side is pulled upward, the transverse edges of the solar panels 610, 620, 630 on the one side of the first pulley 560 are pulled upward. Simultaneously, as the first orientation control member 665 on the other side is slackened, the transverse edges of the solar panels 610, 620, 630 on the other side of the first pulley 560 are allowed to tilt downward. Thus, all the solar panels 610, 620, 630 may tilted in a desired direction to a desired extent by controlling the rotational movement of the first pulley 560. If, on the other hand, the first pulley 560 (and the second pulley 570) is rotated in a clockwise direction, the solar panels 610, 620, 630 may be tilted in an opposite direction. The extent of the tilting of the solar panels 610, 620, 630 is generally proportional to the rotational movement of the first pulley 560 and the second pulley 570.

FIG. 9A illustrates an example of an array 900 of solar panels 610, 620, 630. The array 900 includes the solar panels 610, 620, 630 similar to those of FIG. 8A and the first and second support mechanisms 710, 720 of FIG. 7A. The array 900 further includes a first orientation control member 765, a second orientation control member 865, a third orientation control member (not visible as being behind the first orientation control member in the drawing), and a fourth orientation control member (not visible as being behind the second orientation control member in the drawing). The first orientation control member 765 is coupled, at a first end, to the first support mechanism 710 and, at a second end, to the bracket 636A of the last solar panel 630 at one transverse edge of the last solar panel 630. Similarly, the second orientation control member 865 is coupled, at a first end, to the second support mechanism 720 and, at a second end, to the bracket 636B of the last solar panel 630 at the other transverse edge of the last solar panel 630. The solar panels 610, 620 are also coupled to the first and second orientation control members 765, 865 such that the solar panels 610,

620, 630 maintain a predetermined distance from one another when fully deployed. Each coupling of the brackets 616A, 616B, 636A, 636B and the first and second orientation control member 765, 865 defines a pin-joint such that there is no relative movement between the bracket 418 and the first and second orientation control members 765, 865. The third and fourth orientation control members are likewise connected to a third and a fourth support mechanisms (behind the first and second support mechanisms, respectively) and to brackets behind the brackets 616A, 616B, 636A, 636B in the drawing.

FIG. 9B illustrates the array 900 with the solar panels 610, 620, 630 in a tilted configuration. The first support mechanism 710 is moved upward as illustrated by an arrow B, thereby pulling the first orientation control member 765 and the associated transverse edge of the last solar panel 630 upward. Simultaneously, the second support mechanism 720 is moved downward as illustrated by an arrow C, thereby permitting the second orientation control member 865 and the associated transverse edge of the last solar panel 630 to move downward. In the example where the first and second support mechanisms 710, 720 do not move from their position, the arrows B, C represent effectively shortening and lengthening of the effective lengths of the corresponding first and second orientation control members 765, 865. For instance, if the first support mechanism 710 and the second support mechanism 720 are winches, the arrow B represents winding the first orientation control member 765 on the first support mechanism 710, thereby shortening the effective length of the first orientation control member 730 between the first support mechanism 710 and the last solar panel 630, thereby pulling the associated transverse edge of the last solar panel 630. Simultaneously, the arrow C represents unwinding of the second orientation control member 865 from the second support mechanism 720, thereby lengthening the effective length of the second orientation control member 865 between the second support mechanism 720 and the last solar panel 630, thereby permitting the associated transverse edge of the last solar panel 630 to move downward.

As the first orientation control member 765 and the third orientation control member (behind the first orientation control member 765 in the drawing) are pulled upward, the transverse edges of the solar panels 610, 620, 630 associated with the first orientation control member 765 and the third orientation control member are pulled upward. Simultaneously, as the second orientation control member 865 and the fourth orientation control member (behind the second orientation control member 865 in the drawing) are permitted to move downward, the transverse edges of the solar panels 610, 620, 630 associated with the second orientation control member 865 and the fourth orientation control member are allowed to tilt downward. Thus, all the solar panels 610, 620, 630 may tilted in a desired direction to a desired extent by controlling the upward and downward movements of the first and second support mechanisms 710, 720 as well as the third and fourth support mechanisms. If, on the other hand, the first and second support mechanisms 710, 720 and the third and fourth support mechanisms are moved in an opposite direction, the solar panels 610, 620, 630 may be tilted in an opposite direction. The extent of the tilting of the solar panels 610, 620, 630 is generally proportional to the upward and the downward movements of the first and second support mechanisms 710, 720 and the third and fourth support mechanisms.

Figure 10:
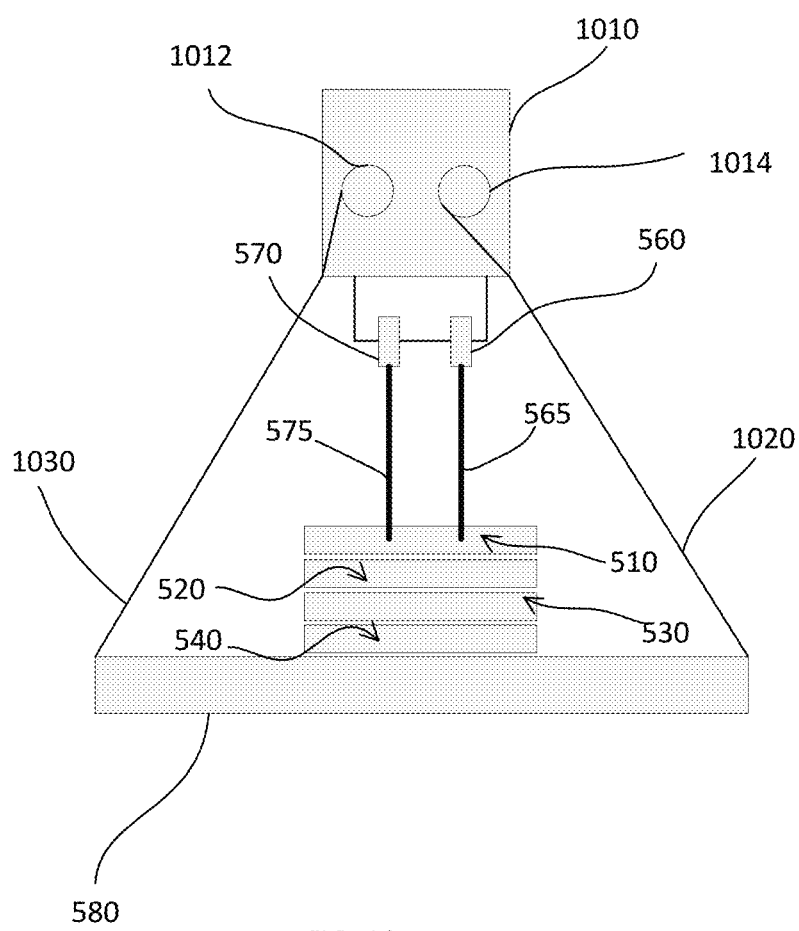
FIG. 10 illustrates an example of the solar panel array of FIG. 5A in a stowed condition on a platform in accordance with aspects of the disclosure.

Referring now to FIG. 10, the solar panels 510, 520, 530, 540 are stacked in an array 500. The array 500 rests on the platform 580. In other examples, any of the arrays 600, 700, 800, 900 may be placed on the platform 580. The platform 580 is coupled to an upper structure 1010 via tension elements 1020, 1030. In an example, each tension element 1020, 1030 may be wound on respective spool elements 1012, 1014 in the upper structure 1010. In the illustrated example, when the spool elements (i.e., spools) 1012, 1014 rotate in a clockwise direction, the tension elements 1020, 1030 are pulled upwards and are wound on the spool elements 1012, 1014, thereby pulling the platform 580 towards the upper structure 1010. On the other hand, when the spool elements 1012, 1014 rotate in a counter-clockwise direction, the tension elements 1020, 1030 are released from the corresponding spool elements 1012, 1014 and the platform 580 may move away from the upper structure 1010, for example, when acted upon by gravitational forces. Of course, in other examples, the direction of rotation of the spool elements 1012, 1014 may be reversed for the ascent and descent of the platform 580 relative to the upper structure 1010. In one example, each of the spool elements 1012, 1014 include a torsional damper (not shown) to control the rotational speed of the spool elements 1012, 1014, and thereby, the rate of descent of the platform 580 relative to the upper structure 1010. Such torsional dampers are known in the art and therefor are not described in further detail for the sake of brevity.

When the balloon 200 has reached a predetermined altitude, the lower platform 580 is allowed to descend relative to the upper structure 1010 via the tension elements 1020, 1030. The spool elements 1012, 1014 are rotated in a counter-clockwise direction in the illustrated example to permit the platform 580 to descend relative to the upper structure 1010. As soon as the platform 580 has descended by a distance greater than the length of the orientation control members 565, 575, the orientation control members 565, 575 become taut and arrest the descent of the topmost solar panel 510, while the rest of the array 500 and the platform 580 continue their descent. The solar panels 520, 530, 540 are subsequently deployed as illustrated in FIG. 5B.

In another example, instead of the platform 580 moving downward relative to the upper structure 1010, the upper structure 1010 may be moved upward relative to the platform 580. The solar panels of the array 500 would deploy in essentially the same manner as described above, with the foremost or the topmost solar panel 510 being lifted off the stack 500 as the upper structure 1010 moves upward via the orientation control members 565, 575 and each subsequent solar panel of the stack 500 being lifted off the stack as the upper structure 1010 continued its ascent.

An advantage of the configurations above is that the solar panels may be deployed initially in a horizontal configuration using gravity. Furthermore, the solar panels may be tilted in a desired direction to optimize the collection of solar power by having the solar panels face the sun and track the sun as the earth rotates and the day progresses.

The solar array systems described above may further include components such as transformers and electric harnesses for transmitting electric energy collected by the solar panels to the payload 220. Such systems are known in the art and are, therefore, not described in detail. The electric harnesses may extend, for example, along with the orientation control members described above.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
an upper structure, the upper structure including a first spool element and a second spool element;
a lower structure;
an array of deployable solar panels that are stacked prior to deployment, the solar panels having a horizontal orientation and being parallel to each other while suspended between the upper structure and the lower structure when initially deployed;
a first pulley and a second pulley supported by the upper structure;
a first orientation control member engaged with the first pulley;
a second orientation control member engaged with the second pulley;
a first tension element engaged with the first spool element of the upper structure; and
a second tension element engaged with the second spool element of the upper structure,
wherein the first and second tension elements are connected to the lower structure,
wherein the first orientation control member is connected to a first transverse edge of a foremost solar panel of the array of deployable solar panels,
wherein the second orientation control member is connected to a second transverse edge of the foremost solar panel, and
wherein the system is arranged such that rotating at least one of the first and second pulleys changes the orientation of the array of deployable solar panels relative to the upper structure and the lower structure.

2. The system of claim 1, wherein each solar panel of the array of deployable solar panels comprises a first bracket along a first transverse edge of the solar panel and a second bracket along a second transverse edge of the solar panel.

3. The system of claim 2,
wherein the first orientation control member is connected to the first bracket along the first traverse edge of the solar panel, and the second orientation control member is connected to the second bracket along the second traverse edge of the solar panel.

4. The system of claim 2, further comprising:
a third orientation control member coupled, at a first end thereof, to the first bracket of the foremost solar panel and, at a second end thereof, to the first bracket of an adjacent solar panel; and
a fourth orientation control member coupled, at a first end thereof, to the second bracket of the foremost solar panel and, at a second end thereof, to the second bracket of the adjacent solar panel.

5. The system of claim 4, wherein each of the first and second brackets of the foremost solar panel comprises a first aperture and a second aperture, and
wherein the first orientation control member is coupled to the first aperture of the first bracket of the foremost solar panel and the second orientation control member is coupled to the first aperture of the second bracket of the foremost solar panel.

6. The system of claim 5, wherein the first end of the third orientation control member is coupled to the second aperture of the first bracket of the foremost solar panel and the second end of the third orientation control member is coupled to the first aperture of the first bracket of the adjacent solar panel, and
wherein the first end of the fourth orientation control member is coupled to the second aperture of the second bracket of the foremost solar panel and the second end of the fourth orientation control member is coupled to the first aperture of the second bracket of the adjacent solar panel.

7. The system of claim 2, wherein each solar panel of the array of deployable solar panels comprises a third bracket along the first transverse edge of the solar panel and a fourth bracket along the second transverse edge of the solar panel.

8. The system of claim 7, further comprising:
a third orientation control member coupled, at a first end thereof, to the first bracket of the foremost solar panel and, at a second end thereof, to a first bracket of an adjacent solar panel;
a fourth orientation control member coupled, at a first end thereof, to the second bracket of the foremost solar panel and, at a second end thereof, to the second bracket of the adjacent solar panel;
a fifth orientation control member coupled, at a first end thereof, to the third bracket of the foremost solar panel and, at a second end thereof, to the third bracket of the adjacent solar panel; and
a sixth orientation control member coupled, at a first end thereof, to the fourth bracket of the foremost solar panel and, at a second end thereof, to the fourth bracket of the adjacent solar panel.

9. The system of claim 1, further comprising a balloon.

10. The system of claim 9, wherein the balloon is configured for use in the stratosphere.

11. The system of claim 1, wherein the first and second spool elements are configured to rotate, causing the tension elements to move the lower structure towards the upper structure when rotated clockwise or move the lower structure away from the upper structure when rotated counterclockwise.

12. The system of claim 1, wherein the array of deployable solar panels are configured to rest on the lower structure when stacked prior to deployment.

13. The system of claim 1, wherein each of the first and second spool elements includes a torsional damper to control rotational speed of the first and second spool elements.

* * * * *